United States Patent Office 3,438,974
Patented Apr. 15, 1969

3,438,974
HYDRAZO STEROIDS AND METHOD OF
MANUFACTURE
Munemitsu Tomoeda, Kanazawa, Japan, assignor to
Schering Corporation, Bloomfield, N.J., a corporation of New Jersey
No Drawing. Continuation-in-part of application Ser. No.
438,100, Mar. 8, 1965. This application May 6, 1966,
Ser. No. 548,035
Int. Cl. C07c 173/10, 167/06
U.S. Cl. 260—239.5                                17 Claims

ABSTRACT OF THE DISCLOSURE

The process of reacting an azodicarboxylic acid ester or an equivalent thereof with a steroid homo cisoid conjugated diene in a non-reactive solvent yields a hydrazo steroid of the group consisting of a 1,4-adduct and an allylic adduct of said steroid homo cisoid conjugated diene with said azodicarboxylic acid ester or equivalent thereof, which hydrazo steroids have bactericidal, bacteriostatic and fungicidal properties. Also useful as anti-androgens are a preferred species of hydrazo steroids, i.e. 20-lower alkanoyloxy - 16,21 - hydrazo - 17(20) - pregnene - $N_1$, $N_2$-dicarboxylic acid lower alkyl esters (and amides) and the corresponding 20-hydroxy derivatives thereof, said 20-hydroxy derivatives usually being isolated in the tautomeric 20-keto form as 20-keto-16,21-hydrazo-17 ($\alpha$ and $\beta$)-pregnane-$N_1$,$N_2$-dicarboxylic acid lower alkyl esters (or amides).

This application is a continuation-in-part of copending application Ser. No. 438,100, filed Mar. 8, 1965, now abandoned, of Munemitsu Tomoeda for Hydrazo Steroids and Method of Manufacture.

This invention relates to compositions of matter classified in the art of chemistry as hydrazo steroids and to methods for the manufacture of and use of such compositions.

The invention sought to be patented in its process aspect is defined as residing in the concept of preparing a hydrazo steroid of the group consisting of 1,4- and allylic adducts of a steroid homo cisoid conjugated diene with an azodicarboxylic lower alkyl ester, or a hereinafter disclosed equivalent thereof, by admixing a steroid homo cisoid conjugated diene with the aforementioned dienophile in an inert organic solvent at a temperature in the range of from about room temperature to the reflux temperature of the reaction mixture.

The invention sought to be patented in one of its composition aspects resides in the concept of the 1,4-adduct of an azodicarboxylic lower alkyl ester, or its hereinafter disclosed equivalent, with a steroid homo cisoid conjugated diene. A preferred species of this composition aspect are the 1,4-adduct of an azodicarboxylic acid lower alkyl ester or amide with a 16,20-pregnadiene.

The invention sought to be patented in another of its composition aspects resides in the concept of an allylic adduct of an azodicarboxylic lower alkyl ester with a steroid homo cisoid conjugation diene.

Virtually any steroid of the androstane, pregnane, or cholestane series, for example, which possesses a homo cisoid conjugated diene system will serve as the starting material for effecting the process aspect of this invention to produce a tangible embodiment of the product aspects. By homo cisoid is meant that the double bonds are conjugated between carbon atoms in the cis spatial configuration. For the most part, a homo cisoid conjugated diene will be homo annular, that is, the conjugated double bonds of the starting material will be contained within the same ring of the condensed 4-ring steroid nucleus such as exemplified by a 1,3-diene, a 2,4-diene, a 5,7-diene, a 6,8(9)-diene, a 8(14), 9(11)-diene, a 8(9), 11(12)-diene, a 14,16-diene and the like. In certain instances, the conjugated diene system satisfies the requirements of being homo cisoid when it is not homo annular such as is evidenced by the 16,20-diene system or the 7,14-diene system.

The following scheme depicts the general reaction of the process aspect of the invention.

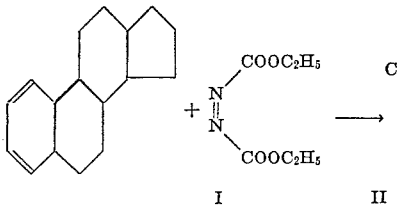 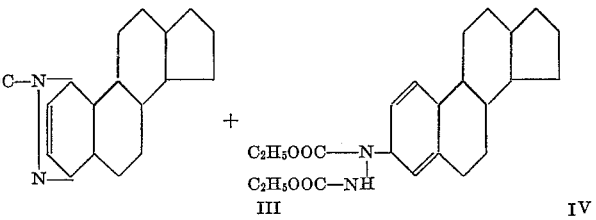

I        II                III        IV

In the foregoing scheme, only the four-ring nucleus of the starting steroid homo cisoid conjugated diene is shown for the sake of simplicity. At C–10 and/or C–13, hydrogen may be present or an angular substituent such as a lower alkyl group and preferably methyl. Substituents, as described later herein may appear on the nucleus and side chain at the 17-position. A 1,3-diene is depicted solely by way of exemplification for it is apparent that a homo cisoid conjugated diene may be present in a finite number of other places in the steroid molecule. In the 10,13-dimethyl steroid group of compounds represented by androstanes, pregnanes, cholestanes, coprostanes, and the like, the diene system may be present at the following positions: (1,3), (2,4), (5,7), (6,8), (7,14), (8,11), (8(14)), 9(11)), (14,16), and (16,20). In the 19-nor analogs of the foregoing, the diene system may also be present at the following positions: (1(10),2), (1(10),4), (1(10), 9(11)), (1,5(10)), (3,5(10)), (5(10),6), (5,9), (7,9) and (5(10),8); and in the 18-nor analogs of the foregoing the diene systems may also be present at (9(11), 12). Analogous formation of a 1,4-adduct or allylic adduct occurs concomitant with analogous shifting of the double bonds.

As stated heretofore, any steroid possessing the basic requirement of a homo cisoid conjugated diene is a suitable starting material for my reaction. The steroid may bear substituents without limit provided such substituents do not react with the dienophile, II. Carbonyl groups if present and reactive to the dienophile are preferably first protected as ketals or acetals while hydroxy or amino groups are preferably first blocked by means of an acylating agent such as acetic or benzoic anhydride or chloride forming an ecyl ester or amide, while carboxyl groups are preferably esterified. Thus carbonyl groups, preferably protected by ketalization (or acetal formation) may be present at positions such as C–3, 11, 17, 20, 21, for example, hydroxyl groups preferably in the form of lower alkanoyl esters may be present at positions C–3, 11, 12, 14, 16, 17, 20, 21, for example. Similarly, amino and carboxy groups, also preferably protected as described above, may appear at various places in the steroid. Groups such as alkyl containing up to 4 carbons and preferably methyl, may apear at positions C–1, 2, 6, 7, 10, 11, 13, 16, 17 and 21. Indeed, even longer chains may appear at C–17 as evidenced by the cholestane series. The alkyl groups do not have an effect upon the reaction. Similarly, halogeno groups, such as fluoro, chloro, bromo and iodo may be present at various positions, for example, at C–6 and C–9, without effecting the course of the reaction. In addition, ester and ether groups may be present since they have little or no effect on the course of the reaction.

The starting materials, or their derivatives, are known in the art or may be prepared by methods established in the art. Representative of such starting materials are:

2,4-cholestadiene,
5,7-androstadiene-3$\beta$,17$\beta$-diol 3,17-diacetate,
5,7-androstadiene-3$\beta$,17$\beta$-diol 3-acetate 17-benzoate,
5,7-androstadiene-3$\beta$,17$\beta$-diol 3,17-dibenzoate,
3$\beta$-hydroxy-5,7-androstadien-17-one 3-acetate,
3$\beta$-hydroxy-5,7-androstadien-17-one 3-benzoate,
3$\beta$-hydroxy-5,7-pregnadien-20-one 3-acetate,
3$\beta$-hydroxy-5,7-pregnadien-20-one 3-benzoate,
3$\beta$,21-dihydroxy-5,7-pregnadien-20-one 3,21-diacetate,
3$\beta$,21-dihydroxy-5,7-pregnadien-20-one 3,21-dibenzoate,
5,7-norcholestadien-3$\beta$-ol 3-acetate,
5,7-norcholestadien-3$\beta$-ol 3-benzoate, 5,7-cholestadiene,
7-dehydrocholesterol 3-acetate,
7-dehydrocholesterol 3-methyl ether,
7-dehydrocholesterol 3-benzoate,
22-iso-5,7-spirostadien-3$\beta$-ol 3-acetate,
22-iso-5,7-spirostadien-3$\beta$-ol 3-benzoate,
3$\beta$-acetoxy methyl-5,7-cholestadiene,
methyl 5,7-cholestadiene-3-carboxylate,
ergosterol 3-acetate, ergosterol 3-benzoate,
6,8-coprostadien-3$\beta$-ol 3-acetate,
methyl 3$\alpha$,12$\beta$-dihydroxy-7,14-choladienoate 3,12-diacetate, cholesterol-B$_3$ 3-acetate,
ergosterol-B$_3$ 3-acetate,
3$\alpha$-acetoxy-16,20-pregnadien-11-one,
3$\beta$-acetoxy-16-allopregnen-20-one 20-enol acetate (i.e. 3$\beta$-acetoxy-5$\alpha$-16-pregnen-20-one 20-enol acetate),
3$\beta$-acetoxy-5,16-pregnadien-20-one 20-enol acetate,
3$\beta$-benzoyloxy-5,16-pragnadien-20-one 20-enol acetate,
5,16,20-furostatriene-3$\beta$,26-diol 3,26-diacetate,
16-anhydrogitoxigenin acetate,
$\beta$-(3$\beta$-acetoxy-16-etioallocholenyl-17)-$\Delta^{\alpha,\beta}$-butenolide,
3$\alpha$-acetoxy-16-pregnen-20-one 20-enol acetate,
3$\beta$-acetoxy-16-allopregnene-11,20-dione 20-enol acetate (i.e. 3$\beta$-acetoxy-5$\alpha$-16-pregnene-11,20-dione 20-enol acetate),
3$\beta$-acetoxy-16-allopregnene-11,20-dione 9(11),20-bisenol acetate (i.e. 3$\beta$-acetoxy-5$\alpha$-16-pregnene-11,20-dione 9(11),20-bisenol acetate),
3$\beta$,11$\alpha$-diacetoxy-16-allopregnen-20-one 20-enol acetate (i.e. 3$\beta$,11$\alpha$-acetoxy-5$\alpha$-16-pregnen-20-one 20-enol acetate),
3$\alpha$-acetoxy-16-pregnen-11,20-dione 20-enol acetate,
3$\alpha$,11$\beta$-diacetoxy-16-allopregnen-20-one 20-enol acetate (i.e. 3$\alpha$,11$\beta$-diacetoxy-5$\alpha$-16-pregnen-20-one 20-enol acetate).

Included within the foregoing are the ketals, e.g. ethylene ketal, of the carbonyl containing steroids, said ketals being preparable by standard methods well known in the art.

In addition to the foregoing, $\Delta^{2,4}$-steroids of the androstane and pregnane series as described for example in U.S. Patents 3,082,220, 3,086,012, 3,086,013, and 3,138,619 as well as $\Delta^{3,5(10)}$-dehydro androstanes as described in U.S. Patent 3,096,353 may serve as starting materials with or without further derivatization (protection of functional groups).

The dienophilic azodicarboxylic ester, II, is the preferred reactant for reasons of its ease of availability and preparation. Other lower alkyl esters such as methyl and propyl are considered full equivalents. Also considered as an equivalent of the aforementioned dienophiles are azodicarboxylic amides and their N-lower alkyl analogs. These behave in analogous fashion to the aforementioned azodicarboxylic esters giving rise to adducts possessing an amido function in place of the carbalkoxy group. The reaction is carried out in a non-reactive solvent which will dissolve the reactants and possess a boiling point in the range of about 50° to 120° C. Preferably the solvent is benzene and the temperature of the reaction established by refluxing the mixture until substantial reaction has occurred, usually less than 30 hours. Other solvents which may be employed are hydrocarbons such as toluene, heptane; ethers such as tetrahydrofuran, dioxane, di-isopropyl ether, di-n-butyl ether; esters such as ethyl acetate, methyl propionate and the like; nitriles such as acetonitrile, propionitrile; amides such as dimethylformamide, dimethylacetamide and the like.

The product(s) of the reaction are removed by usual techniques such as fractional crystallization or chromatographic separation. The products of the reaction, namely the 1,4-adduct as exemplified by III, supra, and the allylic adduct as exemplified by IV, supra, are formed in varying ratios to each other depending upon the spatial characteristics and substitution characteristics of the starting diene.

The products of the reaction, namely the 1,4-adduct as represented by III and the allylic adduct, as represented by IV, have valuable bactericidal, bacteriostatic and fungicidal properties especialy against gram positive organisms. They are thus useful as germicides and fungicides. Compositions comprising such products may be used in solutions, suspensions of solid mixtures to sterilize laboratory equipment, hospital areas and the like. In addition, the products of the reaction are useful intermediates and building blocks for preparing other pharmacologically active substances. For example, the products may be quaternized with lower alkyl halides or sulfates thus forming quaternary salts which themselves are germicidal substances. Further various chemical transformations such as reduction of the ester groups to hydroxyl or removal thereof gives rise to steroidal amines which lend themselves to additional transformations.

In addition to the foregoing, useful as anti-androgens are a preferred species of one of the composition aspects of my invention, namely 20-lower alkanoyloxy-16,21-hydrazo - 17(20) - pregnene-N$_1$,N$_2$-dicarboxylic acid lower alkyl esters (and amides) (Formula V below wherein R' is lower alkanoyloxy) as well as the corresponding 20-hydroxy derivatives thereof (Formula V wherein R' is hydrogen). The 20-hydroxy derivatives are isolated in the more stable tautomeric 20-keto form (Formula VI below) as 20 - keto - 16,21-hydrazo-17($\alpha$ and $\beta$)-pregnane-N$_1$,N$_2$-dicarboxylic acid lower alkyl esters (or amides).

The 16,21 - hydrazopregnane - N$_1$,N$_2$-dicarboxylic acid derivatives of my invention, useful as anti-androgens, include derivatives defined by following Formulae V below and the 5-dehydro analogs thereof, it being understood that when R' is hydrogen, the 16,21-hydrazo-N$_1$,N$_2$-dicarboxylic acid pregnane derivatives (V') are isolated in the more stable tautomeric form as 20-keto-17(α and β)-pregnanes as shown in Formula VI below.

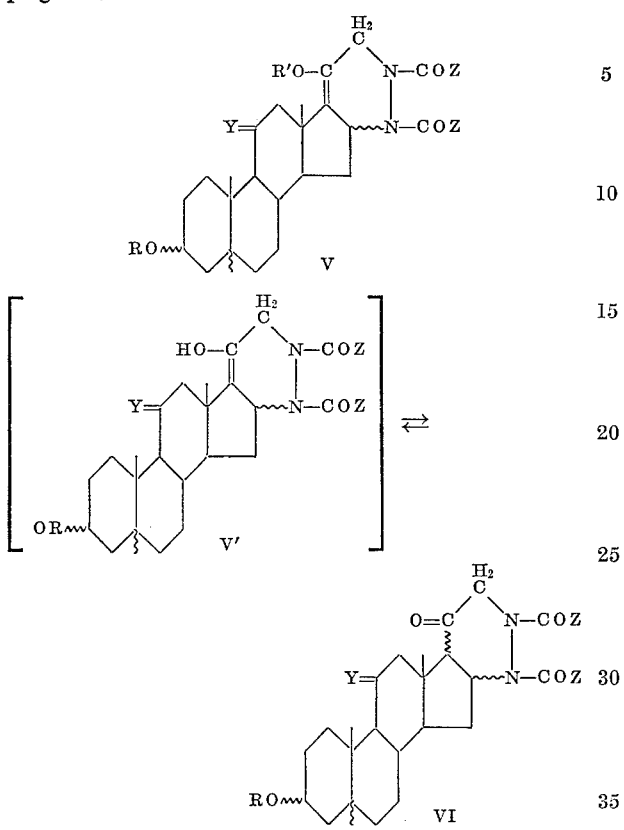

wherein R is an acid radical of a hydrocarbon carboxylic acid having up to 8 carbon atoms; Y is a member selected from the group consisting of hydrogen, keto, (H,αOR″) and (H,βOR″); R′ and R″ are members selected from the group consisting of hydrogen and lower alkanoyl; and Z′ is a member selected from the group consisting of amido and lower alkoxy.

By lower alkyl are contemplated hydrocarbon radicals having up to four carbon atoms, preferably methyl and ethyl.

By lower alkoxy are thus contemplated alkoxy radicals having up to four carbon atoms.

Included within the term "acid radical of a hydrocarbon carboxylic acid having up to 8 carbon atoms" are acid radicals of lower alkanoic acids including propionic, butyric, valeric, caproic, and, preferably, acetic; as well as aryl carboxylic acids such as toluic acid and, preferably, benzoic acid.

In the above formulae, the use of a wavy line (∼)

indicates that the group attached by a bond so drawn may exist in either an alpha or beta position relative to the nuclear carbon to which it is joined. Thus, a 20-enol-acetate-16,21-hydrazo derivative of my invention (V) exists in two isomeric forms, namely, as 16α,21-hydrazo and 16β,21-hydrazo derivatives. Throughout this specification and in the claims, when a configuration is not specified in a compound name, it is understood that both isomeric forms are included. Thus the compound name, diethyl 3β - benzoyloxy - 20 - acetoxy - 16,21 - hydrazo-5,17(20) - pregnadiene-$N_1,N_2$-dicarboxylate (a compound of Formula V wherein R is benzoyl, R′ is acetyl, Y is hydrogen, and Z is —$OC_2H_5$) implicitly includes both the 16α- and 16β-isomers, namely, diethyl 3β-benzoyloxy-20-acetoxy - 16α,21-hydrazo-5,17(20)-pregnadiene-$N_1,N_2$-dicarboxylate and diethyl 3β-benzoyloxy-20-acetoxy-16β,21-hydrazo-5,17(20)-pregnadiene-$N_1,N_2$-dicarboxylate. Similarly, the compound name, diethyl 3β-benzoyloxy-20-keto-16,21 - hydrazo - 17(α and β)-5-pregnene-$N_1,N_2$ - dicarboxylate (a compound of Formula VI wherein R is benzoyl, Y is hydrogen, and Z is —$OC_2H_5$) inherently includes the 16α,17α- and 16β,17β-isomeric forms, namely diethyl 3β-benzoyloxy - 20 - keto-16α,21-hydrazo-17α-5-pregnene-$N_1,N_2$-dicarboxylate and diethyl 3β-benzoyloxy-20-keto-16β,21-hydrazo-5-pregnene - $N_1,N_2$-dicarboxylate (it being understood when no configuration is given for the C-17 side chain that it is in the beta position).

Additionally, throughout this specification and in the claims when a name for a pregnane saturated at C-5 does not indicate a specific configuration, it is understood that the hydrogen at C-5 is in the normal, i.e. 5-β-position. Thus, the name 3α-acetoxy-16-pregnen-20-one 20-enol acetate indicates that the hydrogen at C-5 is in the beta position, and the compound might also be named 3α-acetoxy-5β-16-pregnen-20-one 20-enol acetate.

Included in the preferred group of compounds (V) are the 1,4-adducts of azodicarboxylic acid ethyl ester with 20-acetoxy-16,20-pregnadienes such as:

(1′) Diethyl 3β,20-diacetoxy-16,21-hydrazo-5,17(20)-pregnadiene-$N_1,N_2$-dicarboxylate, (2) 3β - benzoyloxy-5,16-pregnadien - 20-one 20-enol acetate, (3) 3α-acetoxy-5β-16-pregnene-11,20-dione 20 - enol acetate, (4) 3β - acetoxy - 5α-16-pregnene-11,20-dione 20-enol acetate, (5) 3α-acetoxy-5β-16-pregnen-20-one 20-enol acetate, (6) 3β-acetoxy-5α-16-pregnen-20-one 20-enol acetate, (7) 3β,11 - diacetoxy-5α-9(11),16-pregnadien - 20-one 20-enol acetate, (8) 3β,11α - diacetoxy-5α-16-pregnen - 20-one 20-enol acetate, and (9) 3α,11β - diacetoxy - 5β-16-pregnen-20-one 20-enol acetate, each of which adducts are derived in the 20-enol acetate form (i.e. Formula V wherein R′ is acetyl, Z being ethoxy) and are named, respectively, as follows:

(1′) Diethyl 3β,20-diacetoxy-16,21-hydrazo - 5,17(20) pregnadiene-$N_1,N_2$-dicarboxylate, (2′) Diethyl 3β-benzoyloxy-20-acetoxy-16,21-hydrazo-5,17(20)-pregnadiene-$N_1,N_2$-dicarboxylate, (3′) Diethyl 3α,20-diacetoxy - 11-keto-16,21 - hydrazo-17(20)-pregnene-$N_1,N_2$-dicarboxylate, (4′) Diethyl 3β,20 - diacetoxy - 11-keto-16,21-hydrazo-5α-17(20)-pregnene-$N_1,N_2$-dicarboxylate, (5′) Diethyl 3α,20 - diacetoxy - 16,21-hydrazo-17(20)-pregnene-$N_1,N_2$-dicarboxylate, (6′) Diethyl 3β,20-diacetoxy-16,21-hydrazo-5α-17(20)-pregnene-$N_1,N_2$-dicarboxylate, (7′) Diethyl 3β,11,20 - triacetoxy - 16-21-hydrazo-5α-9(11),17(20)-pregnadiene-$N_1,N_2$-dicarboxylate, (8′) Diethyl 3β,11α,20-triacetoxy-16,21-hydrazo - 5α-17(20)-pregnene-$N_1,N_2$-dicarboxylate, and (9′) Diethyl 3α,11β,20-triacetoxy-16,21-hydrazo - 5α-17(20)-pregnene-$N_1,N_2$-dicarboxylate.

Each of the foregoing 16,21-hydrazo-20-enol acetate derivatives of my invention, upon hydrolysis (such as with methanolic sodium bicarbonate) are converted to the corresponding 20-hydroxy-enol derivative (i.e. a compound of Formula V where R′ is hydrogen, Z being ethoxy) and are isolated in the tautomeric 20-keto form of Formula VI which are named, respectively, as follows:

(1″) Diethyl 3β-acetoxy-20-keto-16,21-hydrazo - 17(α and β)-5-pregnene-$N_1,N_2$-dicarboxylate, (2″) Diethyl 3β-benzoyloxy-20-keto-16,21 - hydrazo-17(α and β)-5-pregnene-$N_1,N_2$-dicarboxylate, (3″) Diethyl 3α-acetoxy-11,20-diketo-16,21 - hydrazo-17(α and β)-pregnene-$N_1,N_2$-dicarboxylate), (4″) Diethyl 3β-acetoxy-11,20-diketo-16,21 - hydrazo-5α-17(α and β)-pregnane-$N_1,N_2$-dicarboxylate, (5″) Diethyl 3β-acetoxy-20-keto-16,21-hydrazo - 5α-17(α and β) -pregnane-$N_1,N_2$-dicarboxylate, (6″) Diethyl 3β-acetoxy-11,20-diketo-16,21 - hydrazo-5α-17(α and β)-pregnane-$N_1,N_2$-dicarboxylate, (7″) Diethyl 3β,11α - diacetoxy-20-keto - 16,21 - hydrazo-5α-17(α and β)-pregnane-$N_1$,$N_2$-dicarboxylate, and (8″) Diethyl 3α,11β-diacetoxy-20-keto-16,21-hydrazo-17(α and β)-pregnane-$N_1$,$N_2$-dicarboxylate.

By way of example, the preparation of a preferred compound of my invention is shown below utilizing 3β-benzoyloxy-5,16-pregnadien-20-one 20-enol acetate (VII) as starting compound:

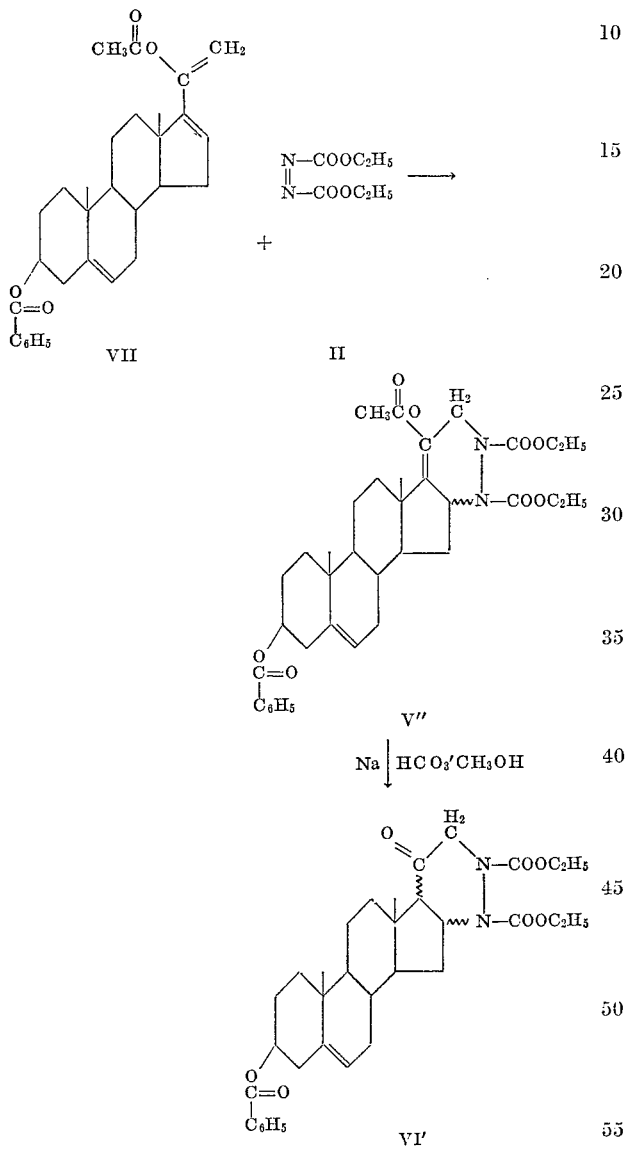

Thus, 3β-benzoyloxy-5,16-pregnadien-20-one 20-enol acetate (VIII) upon reaction with diethyl azodicarboxylate (II) in benzene for about 6–7 hours according to my process, yields diethyl 3β-benzoyloxy-20-acetoxy-16,21-hydrazo-5,17(20)-pregnadiene-$N_1$,$N_2$-dicarboxylate (V″) comprising a mixture of the respective 16α,21-hydrazo and 16β,21-hydrazo isomers, namely diethyl 3β-benzoyloxy-20-acetoxy-16α,21-hydrazo - 5,17(20) - pregnadiene-$N_1$,$N_2$-dicarboxylate and diethyl 3β-benzoyloxy-20-acetoxy-16β,21-hydrazo - 5,17(20) - pregnadiene - $N_1$,$N_2$-dicarboxylate, which are separated via chromatographic techniques such as by chromatography over silica gel eluting with benzene-ether.

The enol acetate derivative V″ is conveniently converted to the corresponding enol derivative (equivalent to the keto derivative VI′) by reaction thereof in refluxing methanolic sodium bicarbonate for about 10 minutes to yield diethyl 3β-benxoyloxy-20-keto-16,21-hydrazo-17(α and β)-5-pregnene-$N_1$,$N_2$-dicarboxylate (VI′), i.e. a mixture of isomers having the 16α,21-hydrazo-17α-pregnane and the 16β,21-hydrazo-17β-pregnane configurations (i.e. the 16α,17α- and the 16β,17β-isomers) shown below which are isolated via chromatographic techniques, e.g. over silica gel eluting with benzene-ether.

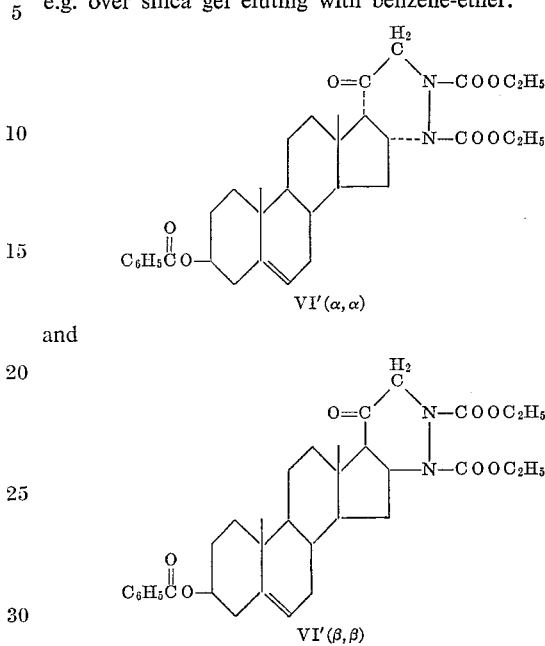

and

In converting the 20-enol acetate-16,21-hydrazo-17(20)-dehydro adduct derivative (e.g. V″) to the 20-keto tautomeric form of the corresponding 20-enol (i.e. to the 20-keto-16,21-hydrazo-17(α and β)-pregnane derivative, VI′) any ester group such as at C–3 may or may not be hydrolyzed depending upon the ester group and/or the length of time in which the ester is heated in methanolic sodium bicarbonate. Thus, for example, when diethyl 3β, 20 - diacetoxy - 16,21-hydrazo-5,17(20)-pregnadiene-$N_1$, $N_2$-dicarboxylate in methanolic sodium bicarbonate is heated at reflux temperature for about 15 minutes or less, there is formed diethyl 3β-acetoxy-20-keto-16,21-hydrazo-17(α and β)-5-pregnene-$N_1$,$N_2$-dicarboxylate, whereas upon continued heating, the corresponding 3-hydroxy derivative is formed. In general, the 3β-benzoyloxy esters do not hydrolyze as easily as do the corresponding 3-acetoxy esters.

It has been found that the preferred 1,4-adducts of my invention, namely, dilower alkyl 20-alkanoyloxy-16,21-hydrazo-17(20)-pregnene-$N_1$,$N_2$-dicarboxylates as exemplified by diethyl 3β - benzoyloxy-20-acetoxy-16,21-hydrazo-5,17(20)-pregnadiene-$N_1$,$N_2$-dicarboxylate (V′) as well as the corresponding 20-hydroxy derivative (isolated in the 20-keto tautomeric form) e.g. diethyl 3β-benzoyloxy-20-keto-16,21-hydrazo-17(α and β)-5 - pregnene-$N_1$,$N_2$-dicarboxylate (VI′) and the analogous 3β-acetoxy derivatives advantageously possess anti-androgenic properties when, for example, they are tested in rats via the subcutaneous route in doses as small as 10 mgm. or 20 mg. per kilogram body weight via pharmacological test procedure similar to that published as Assay No. 17A (effective Apr. 15, 1957) on page 84, Cancer Chemotherapy Reports No. 1, U.S. Department of Health, Education, and Welfare, Public Health Service. My novel 20-oxygenated - 16,21 - hydrazopregnane-$N_1$,$N_2$-dicarboxylic acid derivatives are thus useful in counteracting the effects of androgen-induced conditions or states and as such may be used in the control and treatment of benign prostatic hypertrophy in dogs. This anti-androgenic activity is exhibited by the isomeric mixtures of the 16α,21- and 16β, 21-hydrazo derivatives exemplified by compounds V and VI above, and is also found to be present in each of the 16α- and 16β-isomers per se. Thus, for example, diethyl 3β - benzoyloxy-20-keto-16α,21-hydrazo-17α-5-pregnene- $N_1,N_2$-dicarboxylate and diethyl 3β-benzoyloxy-20-keto-16β,21 - hydrazo - 5 - pregnene-$N_1,N_2$-dicarboxylate each alone or when together as an isomeric mixture exhibit anti-androgenic activity in rats via the subcutaneous route at 10 mgm./kgm.

The above has been given by way of illustration, it being understood that any 20-alkanoyloxy-16,20-pregnadiene upon reaction with a dilower alkyl azodicarboxylate or equivalent thereof according to my process will form an isomeric mixture of 20-alkanoyloxy-16,21-hydrazo-17 (20)-pregnene-$N_1,N_2$-dicarboxylates which are active anti-androgens and which (upon reaction with methanolic sodium bicarbonate) are convertible to the 20-keto-17,20-dihydro tautomeric form of the corresponding 20-hydroxy derivatives which, in turn, are also active as anti-androgens. Specifically, the preferred 16,21-hydrazo-pregnane-$N_1,N_2$-dicarboxylic acid anti-androgens of my invention include diethyl 3β - acetoxy-20-keto-16,21-hydrazo-17(α and β)-5-pregnene-$N_1,N_2$-dicarboxylate, diethyl 3β,20-diacetoxy - 11 - keto-16,21-hydrazo-5α-17(20)-pregnene-$N_1$, $N_2$-dicarboxylate, diethyl 3α,20-diacetoxy-11-keto-16,21-hydrazo-17(20)-pregnene-$N_1,N_2$-dicarboxylate, and diethyl 3β-benzoyloxy-20-keto-16,21-hydrazo-17(α and β)-5-pregnene-$N_1,N_2$-dicarboxylate.

My novel 16,21-hydrazo pregnane-$N_1,N_2$-dicarboxylic acid derivatives as defined by Formulae V and VI can be used in the form of pharmaceutical preparation for subcutaneous administration. In formulating these pharmaceutical compositions, a novel compound of this invention, e.g. diethyl 3β,20-diacetoxy-16,21-hydrazo-5,17(20)-pregnadiene-$N_1,N_2$-dicarboxylate and the 20-hydroxy analog thereof (in the form of the 20-keto tautomer) i.e. diethyl 3β-acetoxy-20-keto-16,21-hydrazo-17(α and β)-5-pregnene-$N_1,N_2$-dicarboxylate may be used as an isomeric mixture (or a single isomer may be used alone) and is usually compounded with a diluent which is chemically inert to the aforenamed 16,21-hydrazo-$N_1,N_2$-dicarboxylate.

Preferred as diluents for the aforementioned formulations are aqueous carboxymethylcellulose (containing 0.9% sodium chloride, 0.4% polysorbate 80, 0.5% carboxymethylcellulose and 0.9% benzyl alcohol) and sesame oil (in which is incorporated less than 5% of a solubilizing agent such as dimethylacetamide).

The dosage used of the aforementioned pharmaceutical preparations will vary depending on the nature and severity of the androgen-induced state being treated.

The following examples are representative of my novel process and some of the products produced thereby:

EXAMPLE 1

Condensation of diethyl azodicarboxylate with $\Delta^{2,4}$-cholestadiene with formation of diethyl 2α,5α-hydrazo-$\Delta^3$-cholestene-$N_1,N_2$-dicarboxylate and diethyl 3β (and 3α)-hydrazino-$\Delta^{1,4}$-cholestadiene-$N_1,N_2$-dicarboxylate Reflux a solution of diethyl azodicarboxylate (1.06 g., 0.0051 mole) and $\Delta^{2,4}$-cholestadiene (2.684 g., 0.0073 mole) in benzene (20 ml.) for 30 hours. The color of the solution gradually fades from orange to pale yellow. Concentrate the solution in vacuo to give a pale yellow oil (wt. 3.30 g.). Chromatograph the oil on neutral alumina (Woelm, grade III) (110 g.), and elute with 1:1 petroleum ether-benzene (300 ml.) obtaining colorless oil (wt. 1.309 g.). Rechromatograph half of the oil on silica gel (66 g.) and elute with benzene (1200 ml.) obtaining diethyl 2α,5α - hydrazo-$\Delta^3$-cholestene-$N_1,N_2$-dicarboxylate (351 mg.), which is chromatographically homogeneous as determined by thin layer chromatograph, U.V. $\lambda_{max.}^{ethanol}$: transparent above 220 mμ

Continue the rechromatography of the reaction product with 9:1 benzene-ether (600 ml.) as eluant obtaining diethyl 3β-hydrazino-$\Delta^{1,4}$-cholestadiene-$N_1,N_2$-dicarboxylate as crystals, M.P. 83–92°, (121 mg.). Recrystallize from aqueous ethanol to obtain colorless needles, M.P. 94–97°.

Analysis.—Calcd. for $C_{33}H_{54}O_4N_2$:, C, 73.02; H, 10.03; N, 5.16. Found: C. 73.02; H, 9.83; N, 5.15. $[\alpha]_D^{15}$ +31° (c. 0.96 in $CHCl_3$), U.V. $\lambda_{max.}^{ethanol}$: transparent above 220 mμ

Elution of the original chromatogram of the reaction product on alumina with 1:1 petroleum ether-benzene (1600 ml.) affords another crop of diethyl 3β-hydrazino-$\Delta^{1,4}$-cholestadiene-$N_1,N_2$-dicarboxylate, M.P. 89–93°, (182 mg.) which upon recrystallization from aqueous ethanol yields material of M.P. 94–97°.

Further elution of the original chromatogram with benzene (1800 ml.) affords diethyl 3α-hydrazino-$\Delta^{1,4}$-cholestadiene-$N_1,N_2$-dicarboxylate as crystals, M.P., 147–150°, (205 mg.). Recrystallization from petroleum ether yields colorless prisms, M.P. 149–151°.

Aanlysis.—Calcd. for $C_{33}H_{54}O_4N_2$: C, 73.02; H, 10.03; N, 5.16. Found: C, 73–13; H, 10.01; N, 5.25. $[\alpha]_D^{15}$ +48° (c. 1.02 in $CHCl_3$)

U.V. $\lambda_{max.}^{ethanol}$: transparent above 220 mμ

EXAMPLE 2

Condensation of diethyl azodicarboxylate with 3β-benzoyloxy-$\Delta^{5,7}$-cholestadiene with formation of diethyl 3β-benzoyloxy - 7 - hydrazino-$\Delta^{5,8(9)}$-cholestadiene-$N_1,N_2$-dicarboxylate and diethyl 3β-benzoyloxy-5α,8a-hydrazo-$\Delta^6$-cholestene-$N_1,N_2$-dicarboxylate Reflux a solution of diethyl azodicarboxylate (500 mg., 0.0029 mole) and 3β-benzoyloxy-$\Delta^{5,7}$-cholestadiene (1.30 g., 0.0027 mole) in benzene (26 ml.) for 27 hours. Concentrate in vacuo to obtain a yellow oil (1.80 g.). Chromatograph the oil on silica gel (Davison Co.) (54 g.), and elute with 49:1 benzene-ether (750 ml.) obtaining a colorless oil (486 mg.). Rechromatograph the colorless oil on 1 mm. silica gel layer (Kiesegel G nach Stahl, Merck) using benzene as eluant, obtaining diethyl 3β-benzoyloxy-5α,8α-hydrazo-5α-$\Delta^6$-cholestene - $N_1,N_2$ dicarboxylate as colorless needles. M.P. 106–107.5° (72 mg.). Recrystallize from methanol, M.P. 110–112° C.

Analysis.—Calcd. for $C_{40}H_{58}O_6N_2$: C, 72.47; H, 8.82; N, 4.23. Found: C. 72.50; H, 8.95; N, 4.37.$[\alpha]_D^{18}$ +44°

U.V. $\lambda_{max.}^{ethanol}$ 230 mμ

(ε=15,800).

Further elution with 19:1 benzene-ether (790 ml.) affords diethyl 3β-benzoyloxy - 7 - hydrazino-$\Delta^{5,8}$cholestadiene-$N_1,N_2$-dicarboxylate as colorless needles, M.P. 166–169° C. (628 mg.) which upon recrystallization from methanol yields materials of M.P. 167–170°.

Analysis.—Calcd. for $C_{40}H_{58}O_6N_2$: C, 72.47; H. 8.82; N, 4.23. Found: C. 72.45; H, 8.40; N, 4.25, $[\alpha]_D^{14}$ −38° (c. 0.70 in $CHCl_3$)

U.V. $\lambda_{max.}^{ethanol}$ 230 mμ

(ε=13,600).

EXAMPLE 3

Diethyl-3β-hydroxy-20-keto-16,21-hydrazo-17 (α and β)-5-pregnene-$N_1,N_2$-dicarboxylate and the 3-acetate ester thereof A. CONDENSATION OF DIETHYL AZODICARBOXYLATE WITH 3β,20 - DIACETOXY - 5,16,20 - PREGNATRIENE WITH FORMATION OF DIETHYL 3β,20-DIACETOXY-16,21 - HYDRAZO-5,17(20)-PREGNADIENE-$N_1,N_2$-DICARBOXYLATE To a solution of 3β,20-diacetoxy-5,16,20-pregnatriene (700 mg.) in benzene (40 ml.), and 310 mg. of diethyl azodicarboxylate. Reflux the mixture for six and one-half hours, then concentrate in vacuo to give a yellow semi-solid residue. Chromatograph this residue on silica gel (55 g.) eluting first with 49:1 benzene-ether (240 ml.), and then obtaining an unreacted 3β,20-diacetoxy-5,16,20-pregnatriene (7 mg.). Elute further with 19:1 benzene-ether (200 ml.) obtaining a colorless semi-solid (5 mg.), and then continue eluting with 19:1 benzene-ether (1180 ml.), obtaining diethyl 3β,20-diacetoxy-16,21-hydrazo-5,17(20)-pregnadiene-$N_1,N_2$-dicarboxylate (i.e. a mixture comprising diethyl 3β,20-diacetoxy - 16α,21 - hydrazo-5, 17(20)-pregnadiene-$N_1,N_2$-dicarboxylate and diethyl 3β, $N_2$-dicarboxylate), as a thin layer chromatographic homogenous colorless semi-solid, M.P. 84–97° C. (weight 940 mg., 84.8%), $[α]_D^{12}$ −58° (chloroform):

$λ_{max.}^{95\%}$ EtOh 199.0 mμ (ε 8860); $λ_{max.}^{Nujol}$ 1754 (sh.), 1731–1711 (s, broad)

B. DIETHYL 3β-HYDROXY-20-KETO - 16,21 - HYDRAZO-17(α AND β)-5-PREGNENE-$N_1,N_2$-DICABOXYLATE

To a solution of 300 mg. of diethyl 3β,20-diacetoxy-16,21 - hydrazo - 5, 17(20) - pregnadiene-$N_1,N_2$-dicarboxylate in 90% methanol (50 ml.), add 100 mg. of sodium bicarbonate. Heat the mixture (pH=9.5) at reflux temperature for 40 minutes (at which time the pH of the solution is around 7.5). Add acetic acid dropwise until the pH of the solution is around 6.0. Concentrate in vacuo to a small volume, then extract with ether. Wash the ethereal solution with water, then dry over anhydrous sodium sulfate, filter and concentrate in vacuo to a pale yellow semisolid residue (weight 268 mg.). Chromatograph the residue on silica gel (14 g.). Elution with 9:1 benzene-ether (120 ml.) gives unreacted diethyl 3β,20 - diacetoxy - 16,21 - hydrazo - 5,16(21) - pregnadiene-$N_1,N_2$-dicarboxylate (16 mg.). Further elution with 7:3 benzene-ether (175 ml.) gives diethyl 3β-hydroxy-20-keto - 16, 21 - hydrazo - 17(α and β) - 5 - pregnene-$N_1,N_2$-dicarboxylate (i.e., an isomeric mixture comprising diethyl - 3β - hydroxy - 20 - keto - 16α,21-hydrazo-17α,5 - pregnene - $N_1,N_2$ - dicarboxylate and diethyl-3β-hydroxy - 20 - keto - 16β,21 - hydrazo - 5 - pregnene-$N_1,N_2$-dicarboxylate), as a thin layer chromatographic homogeneous colorless semi-solid, M.P. 52–82° C. $[α]_D^{25}$—40° (chloroform)

$λ_{max.}^{Nujol}$ 3465–3395

(m., broad), 1737 (sh.), 1727–1695 (s., broad).

C. DIETHYL 3β-ACETOXY-20-KETO - 16,21 - HYDRAZO-17(α AND β)-5-PREGNENE-$N_1,N_2$-DICARBOXYLATE

To a solution of 800 mg. of 3β - hydroxy- 20 - keto-16,21 - hydrazo - 17(α and β) - 5 - pregnene - $N_1,N_2$-dicarboxylate in 12 ml. of pyridine at about 0° C., add acetic anhydride (4 g.). Allow the mixture to stand at room temperature for one hour, then pour into ice water. Extract the aqueous mixture with ether, and wash the ethereal solution first with 10% sulfuric acid followed by water, saturated aqueous sodium bicarbonate solution, and finally again with water. Dry the washed ethereal solution over anhydrous sodium sulfate, filter and concentrate in vacuo to a solid comprising diethyl 3β-acetoxy - 20 - keto - 16,21 - hydrazo - 17(α and β) - 5-pregnene-$N_1,N_2$-dicarboxylate (i.e., an isomeric mixture comprising diethyl 3β - acetoxy - 20 - keto - 16α,21-hydrazo - 17α,5 - pregnene - $N_1,N_2$ - dicarboxylate, and diethyl 3β - acetoxy - 20 - keto - 16β,21 - hydrazo-5-pregnene-$N_1,N_2$-dicarboxylate).

Alternatively, the compound of this example is prepared by treating diethyl 3β,20 - diacetoxy - 16,21 - hydrazo - 5 - pregnene - 5,17(20) - pregnadiene - $N_1,N_2$-dicarboxylate (350 mg.) in 90% methanol (50 ml.). Add a solution of one equivalent weight of sodium bicarbonate in methanol and stir for about ten minutes. Isolate and purify the compound of this example via chromatographic techniques.

EXAMPLE 4

Diethyl 3β-benzoyloxy-20-keto-16,21-hydrazo-17 (α and β)-pregnene-$N_1,N_2$-dicarboxylate A. CONDENSATION OF DIETHYL AZODICARBOXYLATE WITH 3β - BENZOYLOXY-20-ACETOXY-5,16,20-PREGNATRIENE WITH FORMATION OF DIETHYL 3β-BENZOYLOXY-20-AXETOXY - 16,21 - HYDRAZO - 5,17(20)-PREGNADIENE-$N_1,N_2$-DICARBOXYLATE Dissolve 5.23 g. of 3β-benzoyloxy - 20 - acetoxy-5,16, 20-pregnatriene and 1.99 g. of diethyl azodicarboxylate in 350 ml. of benzene. Heat the solution at reflux temperature for six hours, then concentrate in vacuo to a residue. Chromatograph the residue on silica gel (236 g.). Elute first with 97:3 benzene-ether (500 ml.) to give 3β-benzoyloxy - 20 - acetoxy - 5,16,20 - pregnatriene (330 mg.). Secondly, elute with 19:1 benzene-ether (2 liters) to give diethyl 3β - benzoyloxy - 20 - acetoxy - 16,21-hydrazo - 5,17(20) - pregnadiene - $N_1, N_2$ - dicarboxylate (i.e., a mixture comprising diethyl 3β - benzoyloxy-20-acetoxy - 16α,21 - hydrazo - 5,17 (20) - pregnadiene-$N_1,N_2$-dicarboxylate, and diethyl 3β - benzoyloxy-20-acetoxy - 16β,21 - hydrazo - 5,17(20) - pregnadiene - $N_1,N_2$-dicarboxylate). (Weight 5.510 g.) M.P. 85.99° C.; $[α]_D^{25}$ −51° (chloroform)

$λ_{max.}^{95\% ethanol}$ 230 (ε 16,000), 276 (ε 2120), 282 mμ (ε 2210);

$ν_{max.}^{Nujol}$ 1758 (s.)

1737–1712 (s., broad), 1604 (2), 1575 (w.) cm.$^{-1}$

B. DIETHYL 3β-BENZOYLOXY-20-KETO-16,21-HYDRAZO-17(α AND β)-5-PREGNENE-$N_1,N_2$-DICARBOXYLATE (1) To a solution of diethyl 3β - benzoyloxy-20-acetoxy - 16,21 - hydrazo - 5,17(20) - pregnadiene - $N_1,N_2$-dicarboxylate (3.85 g.) in 90% methanol (400 ml.), add 510 mg. of sodium bicarbonate. Heat the mixture at reflux temperature for 15 minutes, during which time the pH of the solution changes from about 9.5 to about 7.5. Add acetic acid dropwise to the solution until the pH is adjusted to about 6.0, then concentrate the solution in vacuo to a small volume. Add water and extract with ether. Wash the combined ether extracts with water, then dry over anhydrous sodium sulfate. Concentrate in vacuo to a residue (weight 3.754 g.) comprising diethyl 3β-benzoyloxy - 20 - acetoxy-16,21-hydrazo-5,17(20)-pregnadiene - $N_1,N_2$ - dicarboxylate (i.e., a mixture comprising diethyl 3β - benzoyloxy - 20 - keto - 16α,21 - hydrazo-17α-5- pregnene - $N_1,N_2$ - dicarboxylate and diethyl 3β-benzoyloxy - 20 - keto - 16β,21 - hydrazo-5-pregnene-$N_1,N_2$-dicarboxylate).

(2) Diethyl 3β - benzoyloxy - 20-keto-16α,21-hydrazo-17α-5-pregnene - $N_1,N_2$ - dicarboxylate.—Recrystallize the isomeric mixture obtained in the preceding paragraph (Example 4B-1) from methanol to give diethyl 3β-benzoyloxy - 20 - keto - 16α,21 - hydrazo - 17α - 5 - pregnene-$N_1,N_2$-dicarboxylate (weight 1.563 g.), M.P. 110–134° C. Concentrate the filtrate to a residue (weight 2.19 g.) and chromatograph this residue on silica gel (2.19 g.). Elute first with 24:1 benzene-ether (1 liter), and concentrate the eluate to a residue comprising diethyl 3β-benzoyloxy-20 - keto - 16α,21 - hydrazo - 17α - 5 - pregnene-$N_1,N_2$-dicarboxylate (weight 806 mg.), M.P. 113–143° C. The combined yield of diethyl-3β-benzoyloxy-20-keto-16α,21-hydrazo-17α-5-pregnene-$N_1,N_2$-dicarboxylate equals 2.369 g. (74.3% theory). Purify by recrystallization from methanol, M.P. 153–154° C. $[α]_D^{25}$ −20.7° C. (chloroform)

$λ_{max.}^{95\% ethanol}$ 201 (ε 27,300), 230 (ε 15,900), 274 (ε 1170) 280 mμ (sh.); $ν_{max.}^{Nujol}$ 1737 (s.), 1720 (s.) 1713 (s.), 1604 (w.), 1494 (w.) cm.$^{-1}$ (3) Elute the silica gel column prepared in Example 4B-2 a second time with 24:1 benzene-ether (100 ml.) and concentrate the eluate to a residue comprising an isomeric mixture of diethyl 3β-benzoyloxy-20-keto-16,21-hydrazo - 17(α and β) - 5 - pregnene-$N_1,N_2$-dicarboxylate (weight 78 mg.).

(4) Diethyl 3β - benzoyloxy - 20 - keto - 16β,21 - hydrazo-5-pregnene-$N_1,N_2$-dicarboxylate.—Elute the silica gel column prepared in Example 4B-2 a third time with 24:1 benzene-ether (1200 ml.) and evaporate the elute to a residue comprising diethyl 3β-benzoyloxy-20-keto-16β,21 - hydrazo - 5 - pregnene - $N_1,N_2$ - dicarboxylate (weight 540 mg. 11.5%), M.P. 151–163° C. Purify by recrystallization from methanol, M.P. 174–175° C. $[\alpha]_D^{25}$ +6° (chloroform)

$\lambda_{max.}^{95\% \text{ ethanol}}$ 201 (ε 28,200), 230 (ε 15,200), 274 (ε 1170), 280 mμ (sh.); $\nu_{max.}^{\text{Nujol}}$ 1720 (s.), 1706 (s.), 1602 (w.), 1586 (w.), 1488 (w.) cm.$^{-1}$ C. ALTERNATE PROCEDURE FOR THE PREPARATION OF DIETHYL 3β-BENZOYLOXY - 20 - KETO - 16,21 - HYDROZO-17(α AND β)-5-PREGNENE-$N_1,N_2$-DICARBOXYLATE (1) To a solution of 800 mg. of diethyl-3β-hydroxy-20-keto - 16,21 - hydrazo - 17(α and β) - 5 - pregnene - $N_1$,$N_2$-dicarboxylate (prepared as described in Example 3B) in 12 ml. of pyridine cooled to about 0° C., add 1.60 g. of benzoyl chloride. Allow the mixture to warm to room temperature and stand at room temperature for one hour. Pour the reaction mixture into ice water, extract with ether and wash the combined ether extracts with 10% sulfuric acid, water, saturated aqueous sodium bicarbonate solution, and finally water. Dry the washed ether solution over anhydrous sodium sulfate, and concentrate in vacuo to a residue (M.P. 98–107° C., weight 1.152 mg.) comprising diethyl 3β-benzoyloxy-20-keto-16,21-hydrazo-17(α and β)-5-pregnene-$N_1,N_2$-dicarboxylate (i.e. a mixture comprising diethyl-3β-benzoyloxy-20-keto-16α,21-hydrazo-17α-5-pregnene-$N_1,N_2$-dicarboxylate, and diethyl-3β - benzoyloxy - 20 - keto - 16β,21 - hdrazo - 5 - pregnene-$N_1,N_2$-dicarboxylate).

Purify by recrystallization from ether to give colorless crystals (M.P. 108–112° C., 701 mg.).

(2) Diethyl 3β - benzoyloxy - 20 - keto - 16α,21 - hydrazo - 17α - 5 - pregnene - $N_1,N_2$ - dicarboxylate.— Chromatograph the diethyl 3β-benzoyloxy-20-keto-16,21-hydrazo - 17(α and β) - 5 - pregnene-$N_1,N_2$-dicarboxylate (M.P. 108–112° C.), prepared as described in above Example 4C–1, on silica gel (70 g.) eluting with 97:3 benzene-ether (700 ml.). Concentrate the eluate to a residue (M.P. 108–111° C., 520 mg.), and recrystallize this residue from methanol to give diethyl-3β-benzoyloxy-20-keto - 16α,21 - hydrazo - 17α - 5 - pregnene - $N_1,N_2$-dicarboxylate, M.P. 141–144° C. (434 mg.). Upon a second recrystallization from methanol, the melting point is 146–152° C. $[\alpha]_D^{25}$ −20.7° (chloroform). The ultra-violet and infrared spectra of this sample are identical to that of the compound prepared as described in Example 4B–2.

(3) Elute the silica gel column prepared in above Example 4C–2 with a second reaction (100 ml.) of a 97:3 benzene ether solvent mixture. Combine the eluates to give a residue for about 33 mg. of diethyl 3β-benzoyloxy-20 - keto - 16,21 - hydrazo - 17(α and β) - 5 - pregnene-$N_1,N_2$-dicarboxylate.

(4) Diethyl 3β - benzoyloxy - 20 - keto - 16β,21 - hydrazo - 5 - pregnene - $N_1,N_2$ - dicarboxylate.—Elute the silica gel column prepared in above Example 4C–2 a third time with 350 ml. of 97:3 benzene-ether. Concentrate the eluate to a residue (M.P. 97–100° C., 67 mg.). Recrystallize the residue from methanol to give diethyl 3β - benzoyloxy - 20 - keto - 16β,21 - hydrazo - 5 - pregnene-$N_1,N_2$-dicarboxylate (M.P. 147–155° C., 30 mg.), upon a second crystallization from methanol, M.P. 173–174° C. The ultra-violet and infrared spectra of this sample are identical to the compound prepared as described in Example 4B–4.

EXAMPLE 5

3β-hydroxy-20-keto-16,21-hydrazo-17(α and β)-5-pregnene-$N_1,N_2$-dicarbonamide

A. CONDENSATION OF AZODICARBONAMIDE WITH 3β,20-DIACETOXY-5,16,20-PREGNATRIENE WITH FORMATION OF 3β,20-DIACETOXY - 16,21 - HYDRAZO-5,17 (20)-PREGNADIENE-$N_1,N_2$-DICARBONAMIDE

To a solution of 3β,20-diacetoxy-5,16,20-pregnatriene (1.20 g.) in 60 ml. of benzene, add 370 mg. of azodicarbonamide, and heat the mixture at reflux temperature for four hours. Concentrate in vacuo to a residue, add warm chloroform to the residue, and filter. Concentrate the filtrate in vacuo to a residue (1.38 g.) and chromatograph this residue on silica gel (42 g.), eluting first with 1:1 benzene ether (200 ml.). (Concentration of this eluate yields 3β,20-diacetoxy-5,16,20-pregnatriene, M.P. 136.5–141.5° C.) Elute the silica gel column a second time with 2:1 methanol (500 ml.). Concentrate the eluate to a residue (M.P. 164–191° C., 334 mg.), and recrystallize this residue from ethanol to give 3β,20-diacetoxy-16,21-hydrazo - 5,17(20) - pregnadiene - $N_1,N_2$ - dicarboxylate (i.e. a mixture comprising 3β,20-diacetoxy-16α,21-hydrazo - 5,17(20) - pregnadiene - $N_1,N_2$ - dicarbonamide, and 3β,20 - diacetoxy - 16β,21 - hydrazo - 5,17(20) - pregnadiene-$N_1,N_2$-dicarbonamide), M.P. 270° C. (decomp.) weight 180 mg.

$\lambda_{max.}^{95\% \text{ ethanol}}$ 209.5 mμ (ε 6580); $\nu_{max.}^{\text{Nujol}}$ 3442 (s.), 3326 (s.), 32 24 (sh.), 1755 (s), 1734 (s), 1722 (s.), 1705 (s.), 1684 (s.), 1666 (s.), 1581 (s.), 1558 (sh.) cm.$^{-1}$ B. 3β-HYDROXY-20-KETO-16,21-HYDRAZO-17(α AND β)-5-PREGNENE-$N_1,N_2$-DICARBONAMIDE Reflux for one hour a mixture of 3β,20-diacetoxy-16, 21-hydrazo-5,17(20)-pregnadiene-$N_1,N_2$ - dicarbonamide (200 mg.) and sodium bicarbonate (66 mg.) in 90% methanol (66 ml.). Add acetic acid dropwise until the pH of the mixture is adjusted to 7.0, then concentrate the mixture in vacuo to a small volume and extract with chloroform. Wash the combined chloroform extracts with water, dry over sodium sulfate and concentrate in vacuo to a residue comprising 3β-hydroxy-20-keto-16,21-hydrazo-17(α and β)-5-pregnene-$N_1,N_2$-dicarbonamide (i.e. a mixture comprising 3β-hydroxy-20-keto-16α,21-hydrazo-17α-5-pregnene-$N_1,N_2$-dicarbonamide, and 3β-hydroxy-20-keto-16β,21-hydrazo-5-pregnene - $N_1,N_2$ - dicarbonamide). Purify by triturating the residue with warm chloroform and filtering off the resultant precipitate (M.P. 250–260° (decomp.)), followed by recrystallization from methanol (M.P. 256–258° (decomp.)), weight 84 mg., and a second recrystallization from methanol (M.P. 258–259° (decomp.)), $\nu_{max.}^{\text{Nujol}}$ 3488 (m.), 3451 (s.), 3270 (s.), 3218 (s.), 3184 (m.) 3146 (m.), 1710 (m.), 1692 (s.), 1682–1860 (s, broad), 1601 (s.), 1583 (s.), 1560 (sh.) cm.$^{-1}$

EXAMPLE 6

Diethyl 3α-hydroxy-11,20-diketo-16,21-hydrazo-pregnane-11,20-diketo - 16,21-hydrazo-pregnane - $N_1,N_2$-dicarboxylate A. CONDENSATION OF DIETHYL AZODICARBOXYLATE WITH 3α,20-DIACETOXY-11-KETO-16,20-PREGNADIENE WITH FORMATION OF DIETHYL 3α,20-DIACETOXY-11-KETO-16,21-HYDRAZO - 17(20) - PREGNENE - $N_1,N_2$-DICARBOXYLATE In a manner similar to that described in Example 3A, treat 3α,20-diacetoxy-11-keto-16,20-pregnadiene with diethyl azodicarboxylate in benzene. Isolate and purify the resultant product in a manner similar to that described to give diethyl 3α,20 - diacetoxy-11-keto - 16,21 - hydrazo-17(20)-pregnene-$N_1,N_2$-dicarboxylate (i.e. a mixture comprising diethyl 3α,20-diacetoxy-11-keto-16α,21-hydrazo-17(20)-pregnene-$N_1,N_2$-dicarboxylate and diethyl 3α,20-diacetoxy-11-keto-16β,21-hydrazo - 17(20) - pregnene-$N_1,N_2$-dicarboxylate.

B. DIETHYL 3α-HYDROXY-11,20-DIKETO-16,21-HYDRAZO-17(α AND β)-PREGNENE-$N_1,N_2$-DICARBOXYLATE

In a manner similar to that described in Example 3B, treat diethyl-3α,20-diacetoxy-11-keto - 16,21 - hydrazo-17(20)-pregnene-$N_1,N_2$-dicarboxylate with sodium bicarbonate in methanol at reflux temperature for 40 minutes. Isolate and purify the resultant product in a manner similar to that described to give 3α-hydroxy-11,20-diketo-16,21-hydrazo-17(α and β)-pregnane-$N_1,N_2$-dicarboxylate (i.e. a mixture comprising 3α-hydroxy-11,20-diketo-16α,21-hydrazo-17α-pregnane-$N_1,N_2$-dicarboxylate and diethyl 3α-hydroxy-11,20-diketo-16β,21 - hydrazo - pregnane-$N_1,N_2$-dicarboxylate).

EXAMPLE 7

Diethyl 3β-hydroxy-11,20-diketo-16,21-hydrazo-5α-17(α and β)-pregnane-$N_1,N_2$-dicarboxylate A. CONDENSATION OF DIETHYL AZODICARBOXYLATE WITH 3β,20-DIACETOXY-11-KETO-5α,16,20-PREGNADIENE WITH FORMATION OF DIETHYL 3β,20-DIACETOXY-11-KETO-16,21-HYDRAZO-5α-17(20) - PREGNENE-$N_1,N_2$-DICARBOXYLATE In a manner similar to that described in Example 3A, treat 3β,20-diacetoxy-11-keto-5α-16,20-pregnadiene with diethyl azodicarboxylate in benzene at reflux temperature for 6½ hours. Isolate and purify the resultant product in a manner similar to that described to give diethyl 3β,20-diacetoxy-11-keto-16,21 - hydrazo-5α-17(20)-pregnane-$N_1,N_2$-dicarboxylate (i.e. a mixture comprising diethyl 3β,20-diacetoxy-11-keto-16α,21-hydrazo-5α-17(20)-pregnene-$N_1,N_2$-dicarboxylate, and diethyl-3β,20-diacetoxy - 11 - keto - 16,β,21 - hydrazo-5α - 17(20) - pregnene-$N_1,N_2$-dicarboxylate).

B. DIETHYL 3β - HYDROXY - 11,20 - DIKETO-16,21-HYDRAZO - 5α - 17(α AND β)-PREGNANE - $N_1,N_2$ - DICARBOXYLATE

In a manner similar to that described in Example 3B, treat diethyl 3β,20-diacetoxy-11-keto-16,21-hydrazo-5α-17(20)-pregnene-$N_1,N_2$-dicarboxylate with sodium bicarbonate in methanol at reflux temperature for 40 minutes. Isolate and purify the resultant product in a manner similar to that described to give diethyl 3β-hydroxy-11,20-diketo-16,21-hydrazo-5α-17(α and β)-pregnane-$N_1,N_2$-dicarboxylate (i.e. a mixture comprising diethyl 3β-hydroxy-11,20-diketo-16α,21-hydrazo-5α-17α-pregnane - $N_1,N_2$-dicarboxylate, and diethyl 3β-hydroxy-11,20-diketo-16β,21-hydrazo-5α-pregnane-$N_1,N_2$-dicarboxylate).

EXAMPLE 8

A. Condensation of diethyl azodicarboxylate with 3-acetoxy-16,20-pregnadienes with formation of diethyl 3-acetoxy-16,21-hydrazo - 17(20)-pregnene - $N_1,N_2$-dicarboxylates In a manner similar to that described in Example 3A, treat each of the following 3-acetoxy-16,20-pregnadienes with diethyl azodicarboxylate in benzene at reflux temperature for about six hours:

3α-acetoxy-11-keto-16,20-pregnadiene,
3β,20-diacetoxy-5α-16,20-pregnadiene,
3α,20-diacetoxy-16,20-pregnadiene,
3β,11,20-triacetoxy-9(11),16,20-pregnatriene,
3β,11β,20-triacetoxy-5α-16,20-pregnadiene, and
3α,11β-20-triacetoxy-16,20-pregnadiene.

Isolate and purify each of the resultant products in a manner similar to that described in Example 3A to give, respectively:

Diethyl 3α-acetoxy-11-keto-16,21 - hydrazo - 17(20)-pregnene-$N_1,N_2$-dicarboxylate (i.e. a mixture comprising diethyl 3α-acetoxy-11-keto-16α,21-hydrazo-17(20)-pregnene-$N_1,N_2$-dicarboxylate, and diethyl 3α - acetoxy-11-keto-16β,21-hydrazo-17(20)-pregnene-$N_1,N_2$ - dicarboxylate), Diethyl 3β,20-diacetoxy-16,21-hydrazo-5α-17(20)-pregnene-$N_1,N_2$-dicarboxylate (i.e. a mixture comprising diethyl 3β,20-diacetoxy-16α,21-hydrazo-5α - 17(20)-pregnene-$N_1,N_2$-dicarboxylate, and diethyl 3β,20-diacetoxy-16β,21-hydrazo-5α-17(20)-pregnene-$N_1,N_2$ - dicarboxylate), Diethyl 3α,20-diacetoxy-16,21-hydrazo-17(20) - pregnene-$N_1,N_2$-dicarboxylate (i.e. a mixture comprising diethyl 3α,20-diacetoxy-16α,21-hydrazo-17(20) - pregnene-$N_1,N_2$-dicarboxylate, and diethyl 3α,20-diacetoxy-16β,21-hydrazo-17(20)-pregnene-$N_1,N_2$-dicarboxylate), Diethyl 3β,11,20-triacetoxy-16,21-hydrazo - 5α-9(11),17(20)-pregnadiene-$N_1,N_2$-dicarboxylate (i.e. a mixture comprising diethyl 3β,11,20-triacetoxy-16α,21 - hydrazo-5α-9(11),17(20)-pregnadiene-$N_1,N_2$ - dicarboxylate, and diethyl 3β,11,20 - triacetoxy - 16β,21-hydrazo-5α-9(11)-17(20)-pregnadiene-$N_1,N_2$-dicarboxylate), Diethyl 3β,11α,20-triacetoxy-16,21-hydrazo-5α-17(20)-pregnene-$N_1,N_2$-dicarboxylate (i.e. a mixture comprising diethyl 3β,11α,20-triacetoxy-16α,21-hydrazo-5α - 17(20)-pregnene-$N_1,N_2$-dicarboxylate, and diethyl 3β,11α,20-triacetoxy-16β,21-hydrazo-5α-17(20)-pregnene - $N_1,N_2$ - dicarboxylate), and Diethyl 3α,11β,20-triacetoxy-16,21-hydrazo-5α-17(20)-pregnene-$N_1,N_2$-dicarboxylate (i.e. a mixture comprising diethyl 3α,11β,20 - triacetoxy-16α,21-hydrazo-5α-17(20)-pregnene-$N_1,N_2$-dicarboxylate, and diethyl 3α,11β,20-triacetoxy - 16β,21 - hydrazo-5α-17(20)-pregnene-$N_1,N_2$-dicarboxylate).

B. Diethyl 3-hydroxy-20-keto--16,21-hydrazo-17(α and β) pregnane-$N_1,N_2$-dicarboxylates In a manner similar to that described in Example 3B, treat each of the 20-acetoxy-16,21-hydrazo-17(20)-pregnene-$N_1,N_2$-dicarboxylates prepared in preceding Example 8A with sodium bicarbonate and methanol. Isolate the respective resultant products in a manner similar to that described in Example 3B to obtain, respectively:

Diethyl 3α-hydroxy-11,20-diketo-16,21-hydrazo - 17(α and β)-pregnane-$N_1,N_2$-dicarboxylate (i.e. a mixture comprising diethyl 3α-hydroxy-11,20-diketo-16α,21 - hydrazo-17α - pregnane-$N_1,N_2$-dicarboxylate, and diethyl 3α-hydroxy-11,20-diketo-16β,21-hydrazo pregnane-$N_1,N_2$-dicarboxylate), Diethyl 3β-hydroxy-20-keto-16,21-hydrazo-5α-17(α and β) - pregnane - $N_1,N_2$-dicarboxylate (i.e. a mixture comprising diethyl 3β - hydroxy-20-keto-16α,21-hydrazo-5α-17α-pregnane-$N_1,N_2$ - dicarboxylate, and diethyl 3β-hydroxy-20-keto-16β,21-hydrazo-5α-pregnane - $N_1,N_2$-dicarboxylate), Diethyl 3α-hydroxy - 20-keto-16,21-hydrazo-17(α and β)-pregnane - $N_1,N_2$ - dicarboxylate (i.e. a mixture comprising 3α-hydroxy-20-keto-16α,21-hydrazo-17α-pregnane-$N_1,N_2$ - dicarboxylate, and diethyl 3α-hydroxy-20-keto-16β,21-hydrazo-pregnane-$N_1,N_2$ dicarboxylate), Diethyl 3β-hydroxy-11,20-diketo-16,21-hydrazo - 5α-17 (α and β)-pregnane-$N_1,N_2$-dicarboxylate (i.e. a mixture comprising diethyl 3β - hydroxy-11,20 - diketo - 16α,21-hydrazo - 5α-17α-pregnane-$N_1,N_2$-dicarboxylate, and diethyl 3β-hydroxy-11,20-diketo-16β,21-hydrazo - 5α - pregnane-$N_1,N_2$-dicarboxylate), Diethyl 3β-hydroxy-11α-acetoxy-20-keto-16,21-hydrazo-5α-17(α and β)-pregnane-$N_1,N_2$-dicarboxylate (i.e. a mixture comprising diethyl 3β-hydroxy-11α-acetoxy-20-keto-16α,21-hydrazo-5α-17α-pregnane - $N_1,N_2$ - dicarboxylate, and diethyl 3β - hydroxy-11α-acetoxy-20-keto-16β,21-hydrazo-5α-pregnane-$N_1,N_2$-dicarboxylate), and Diethyl 3α - hydroxy - 11β-acetoxy-20-keto-16,21-hydrazo-5α-17(α and β)-pregnane-$N_1,N_2$-dicarboxylate (i.e. a mixture comprising diethyl 3α-hydroxy-11β-acetoxy-20-keto-16α,21-hydrazo-5α-17α-pregnane-$N_1,N_2$ - dicarboxylate, and diethyl 3α-hydroxy-11β-acetoxy-20-keto-16β,21-hydrazo-5α-pregnane-$N_1,N_2$-dicarboxylate).

EXAMPLE 9

3β-benzoyloxy-20-keto-16,21-hydrazo-17(α and β)-5-pregnene-$N_1,N_2$-dicarbonamide A. CONDENSATION OF AZODICARBONAMIDE WITH 3β-BENZOYLOXY - 20 - ACETOXY-5-PREGNATRIENE WITH FORMATION OF 3β - BENZOYLOXY - 20 - ACETOXY-

16,21 - HYDRAZO - 5,17(20) - PREGNADIENE - $N_1,N_2$-DICARBONAMIDE

To a solution of 3β-benzoyloxy - 20-acetoxy-5,16,20-pregnatriene (1.08 g.) in benzene (200 ml.), add azodicarboxylate (1.30 g.). Stir the reaction mixture at reflux temperature for six hours, then concentrate in vacuo to a residue. Add chloroform (ca. 200 ml.) to the residue and filter. Concentrate the filtrate in vacuo, and add benzene to the resulting residue. Filter the resulting crystalline solid which separates comprising 3β-benzoyloxy-20-acetoxy-16,21-hydrazo-5,17(20)-pregnadiene - $N_1,N_2$ - dicarbonamide (i.e. a mixture comprising 3β-benzoyloxy-20-acetoxy-16α,21-hydrazo-5,17(20) - pregnadiene - $N_1,N_2$-dicarbonamide, and 3β-benzoyloxy-20-acetoxy-16β,21-hydrazo-5,17(20)-pregnadiene-$N_1,N_2$-dicarbonamide), M.P. 244–245° C. (decomp.) weight 186 mg. (53% yield). Purify by recrystallization from methanol, M.P. 249–253° C. (decomp.) $\alpha_D^{24}$ —82° (c. 0.53 in chloroform)

UV $\lambda_{max}^{95\% EtOH}$ mμ

(ε): 200 (44,280), 230 (18,160), 274 (2550);

IR $\nu_{max}^{Nujol}$ cm.$^{-1}$ 3464 (s.), 3417 (s.), 3325 (s.), 3299 (s.) (NH), 1756 (s.) (20-OCOCH$_3$), 1728 (sh.), 1711–1671 (s.), 1580 (s.), 1562 (s.), 1554 (s.) (3β-OCOC$_6$H$_5$, CONH$_2$), 1604 (w.), 1531 (m.), 1493 (w.) (C=C)

NMR τ in pyridine: 5.25 (singlet, four protons) (NH), 7.87 (singlet, three protons) (20-OCOCH$_3$), 9.00 (singlet, three protons) and 9.02 (singlet, three protons) (18- and 19-CH$_3$).

B. 3β-BENZOYLOXY - 20 - KETO - 16,21 - HYDRAZO-17-(α AND β)-5-PREGNENE-$N_1,N_2$-DICARBONAMIDE

To a solution of 3β-benzoyloxy-20-acetoxy - 16,21 - hydrazo-5,17(20)-pregnadiene-$N_1,N_2$ - dicarbonamide (500 mg.) in 90 ml. of methanol (250 ml.), add 73 mg. of sodium bicarbonate (one equivalent). Reflux the solution for ten minutes (during which time the pH of the solution changes from 8.0 to about 7.5). Cool and add glacial acetic acid dropwise (about eight drops) until the pH is adjusted to about 6.0. Concentrate the solution in vacuo and add water (100 ml.) to the residue. Filter, wash with water, and dry the resultant crystalline product which separates comprising 3β-benzoyloxy-20-keto-16,21 - hydrazo-17(α and β)-5-pregnene-$N_1,N_2$-dicarbonamide (i.e. a mixture comprising 3β - benzoyloxy-20-keto-16α,21-hydrazo-17α-5-pregnene - $N_1,N_2$-dicarbonamide, and 3β-benzoyloxy-20-keto-16β,21-hydrazo-5-pregnene-$N_1,N_2$ - dicarbonamide), M.P. 242–245° C. (decomp.) weight 439 mg. Purify by recrystallization from 99% ethanol, M.P. 244–246° C. (decomp.) (highly hygroscopic) weight 399 mg. (86.2%)

UV $\lambda_{max}^{95\% EtOH}$ mμ

(ε): 200 (28,500), 230 (13,450), 274 (730);

IR $\lambda_{max}^{Nujol}$ cm.$^{-1}$

3510–3180 (s.) (NH), 1720–1636 (s.), 1602–1573 (s.) (3β-OCOC$_6$H$_5$, CONH$_2$, C$_{20}$=O), 1540 (w.), 1520 (w.), 1493 (w.) (C=μ,)

NMR τ in pyridine: 5.00 (singlet, four protons) (NH), 9.03 (singlet, three protons) and 9.18 (singlet, three protons) (18- and 19-CH$_3$).

I claim:

1. The process which comprises reacting an azodicarboxylic acid lower alkyl ester with a steroid of the pregnane series having a conjugated diene present at position (16,20) and having no other double bond conjugated to said diene, in an inert solvent at a temperature in the range of from about room temperature to the refluxing temperature of the reaction mixture, whereby is formed a 16,21 - hydrazo - 17(20) - pregnene - $N_1,N_2$ - dicarboxylic acid lower alkyl ester.

2. The process according to claim 1 wherein said azodicarboxylic acid lower alkyl ester is diethyl azodicarboxylate and wherein said steroid of the pregnane series is a 20-lower alkanoyloxy-16,20-pregnadiene, and there is formed a 20-lower alkanoyloxy-16,21-hydrazo-17(20)-pregnene-$N_1,N_2$-dicarboxylic acid ethyl ester.

3. The process according to claim 2 wherein diethyl azodicarboxylate is reacted with 3β,20-diacetoxy-5,16,20-pregnatriene in refluxing benzene whereby is formed diethyl 3β,20 - diacetoxy - 16,21 - hydrazo - 5,17(20)-pregnadiene-$N_1,N_2$-dicarboxylate.

4. The process according to claim 2 wherein diethyl azodicarboxylate is reacted with 3β-benzoyloxy-20-acetoxy-5,16,20-pregnatriene in refluxing benzene whereby is formed diethyl 3β-benzoyloxy-16,21-hydrazo-5,17(20)-pregnadiene-$N_1,N_2$-dicarboxylate.

5. The process according to claim 2 including the additional step of reacting said 20-lower alkanoxyloxy-16,21-hydrazo-17(20)-pregnene-$N_1,N_2$-dicarboxylic acid ethyl ester thereby formed with methanolic sodium bicarbonate whereby is formed a 20-keto-16,20-hydrazo-17(α and β)-pregnane-$N_1,N_2$-dicarboxylic acid ethyl ester.

6. The process according to claim 5 wherein diethyl azodicarboxylate is reacted with 3β-benzoyloxy-20-acetoxy-5,16,20-pregnatriene in refluxing benzene and the diethyl 3β - benzoyloxy - 20 - acetoxy - 16,21 - hydrazo-5,17(20) - pregnadiene - $N_1,N_2$ - dicarboxylate thereby formed is heated in methanolic sodium bicarbonate whereby is formed 3β-benzoyloxy-20-keto-16,21-hydrazo-17-(α and β)-5-pregnene-$N_1,N_2$-dicarboxylate.

7. The process according to claim 5 wherein diethyl azodicarboxylate is reacted with 3β,20-diacetoxy-5,16,20-pregnatriene in refluxing benzene and the diethyl-3β,20-diacetoxy - 16,21 - hydrazo - 5,17(20) - pregnadiene-$N_1,N_2$-dicarboxylate thereby formed is treated with sodium bicarbonate in refluxing methanol whereby is formed diethyl 3β - hydroxy - 20 - keto - 16,21 - hydrazo - 17 (α and β)-5-pregnene-$N_1,N_2$-dicarboxylate.

8. A compound selected from the group consisting of 16,21-hydrazo-17(20)-pregnenes of the following Formula I, the 5-dehydro analogs thereof, and when R' is hydrogen, the 20-keto-17,20-dihydro tautomeric form thereof of Formula II

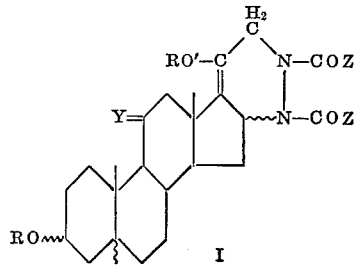

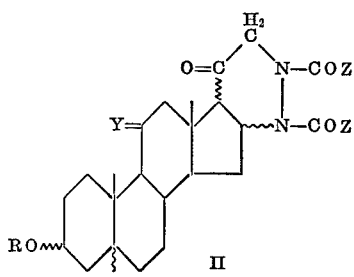

wherein R is a member selected from the group consisting hydrogen; lower alkanoyl, and benzoyl, Y is a member selected from the group consisting of hydrogen, oxygen, (H,αOR") and (H,βOR"); R' and R" are members selected from the group consisting of hydrogen and lower alkanoyl; and Z is a member selected from the group consisting of amido and lower alkoxy.

9. Diethyl 3β,20 - diacetoxy - 16,21 - hydrazo - 5,17(20)-pregnadiene-$N_1,N_2$-dicarboxylate.

10. 3β,20 - diacetoxy - 11 - keto - 16,21 - hydrazo-5α-17(20)-pregnene-$N_1,N_2$-dicarboxylate.

11. Diethyl 3α,20 - diacetoxy - 11 - keto - 16,20-hydrazo-5β-17(20)-pregnene-$N_1,N_2$-dicarboxylate.

12. 3β,20 - diacetoxy - 16,21 - hydrazo - 5,17(20)-pregnadiene-$N_1,N_2$-dicarbonamide.

13. 3β - benzoyloxy - 20 - acetoxy - 16,21 - hydrazo-5,17(20)-pregnadiene-$N_1,N_2$-dicarbonamide.

14. Diethyl 3β - acetoxy - 20 - keto - 16,21 - hydrazo-17(α and β)-5-pregnene-$N_1,N_2$-dicarboxylate.

15. Diethyl 3β - benzoyloxy - 20 - keto - 16,21 - hydrazo-5-pregnene-$N_1,N_2$-dicarboxylate.

16. Diethyl 3β - benzoyloxy - 20 - keto - 16α,21-hydrazo-17α-5-pregnene-$N_1,N_2$-dicarboxylate.

17. Diethyl 3β - benzoyloxy - 20 - keto - 16β,21-hydrazo-5-pregnene-$N_1,N_2$-dicarboxylate.

No references cited.

HENRY A. FRENCH, *Primary Examiner.*

U.S. Cl. X.R.

260—999

UNITED STATES PATENT OFFICE
CERTIFICATE OF CORRECTION

Patent No. 3,438,974                                            April 15, 196

Munemitsu Tomoeda

It is certified that error appears in the above identified patent and that said Letters Patent are hereby corrected as shown below:

Column 1, lines 28 to 37, that portion of Formula II reading

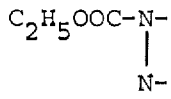 should read 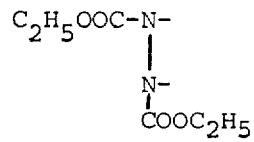

Column 3, line 7, "ecyl ester" should read -- acyl ester --. Column 4, line 43, "especialy" should read -- especially --. Column 6, line 21, "(1/) Dieth 3β,20-diacetoxy-16,21-hydrazo-5,7(20)-pregnadiene-$N_1$,$N_2$-dicarboxylate" should read -- (1) 3β-acetoxy-5,16-pregnadien-20-one 20-enol acetate (i.e. 3β,20-diacet 16,20-pregnatriene --. Column 7, lines 36 to 42, "Na↓ $HCO_3$/$CH_3OH$" should read -- Na↓$HCO_3$/$CH_3OH$ --; line 57, "acetate (VIII)" should read -- acetate (VII)--;lin 74, "3β-benxoyloxy" should read -- 3β-benzoyloxy --. Column 9, line 27, "pharmaceutical preparation" should read -- pharmaceutical preparations --. Column 10, lines 44 and 45, "$[\alpha]_D^{18} \neq 44°$" should read -- $[\alpha]_D^{18} \neq 44°$ (c 0.70 in $CHCl_3$)--; line 55, "(c. 0.70 in $CHCl_3$)" should read -- (c 1.00 in $CHCl_3$) --; line 71, "and 310 mg." should read -- Add 310 mg. --. Column 11, lines 8 and 9, "3β,$N_2$-dicarboxylate" should read -- 3β,20-diacetoxy-16β,21-hydrazo-5, 17(20)-pregnadiene-$N_1$,$N_2$-dicarboxylate --. Column 12, line 3, "20-axetoxy" should read -- 20-acetoxy --. Column 13, lines 11 and 12, "16,21-hydrozo" should read -- 16,21-hydrazo --; line 31, "16β,21-hdrazo-" should read -- 16β,21-hydrazo --. Column 16, line 74, "acetoxy-5-pregnatriene" should read -- acetoxy-5,16,20-pregnatriene --. Column 17, line 56, "IR $\lambda_{max}^{nujol}$ $cm^{-1}$" should read -- IR $\gamma_{max}^{nujol}$ $cm^{-1}$ --; line 60, "(C = μ)" should read -- (C = C) --. Column 18, lines 66 and 67, "consisting hydrogen" should read -- consisting o hydrogen --.

Signed and sealed this 14th day of April 1970.

(SEAL)
Attest:

EDWARD M. FLETCHER, JR.                                          WILLIAM E. SCHUYLER, JR
Attesting Officer                                                                 Commissioner of Patents